(12) United States Patent
Wakileh et al.

(10) Patent No.: US 7,603,020 B1
(45) Date of Patent: Oct. 13, 2009

(54) CABLE CLAMP WITH INTEGRATED TRACE AND BOND CAPABILITY

(75) Inventors: George I. Wakileh, Batavia, IL (US); Jerome A. Maloney, Sugar Grove, IL (US); Eduardo Leon, Woodridge, IL (US); Simon Shen-Meng Chen, Palatine, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 0 days.

(21) Appl. No.: 12/127,312

(22) Filed: May 27, 2008

(51) Int. Cl.
*G02B 6/00* (2006.01)
(52) U.S. Cl. .................. 385/136; 385/134; 385/135
(58) Field of Classification Search .......... 385/133–137
See application file for complete search history.

(56) References Cited

U.S. PATENT DOCUMENTS

| | | | | |
|---|---|---|---|---|
| 4,744,629 A | * | 5/1988 | Bertoglio et al. | 385/59 |
| 4,805,979 A | * | 2/1989 | Bossard et al. | 385/135 |
| 4,961,623 A | * | 10/1990 | Midkiff et al. | 385/95 |
| 5,121,458 A | * | 6/1992 | Nilsson et al. | 385/100 |
| 5,204,929 A | * | 4/1993 | Machall et al. | 385/135 |
| 5,271,080 A | * | 12/1993 | Hopper et al. | 385/76 |
| 5,778,122 A | * | 7/1998 | Giebel et al. | 385/55 |
| 5,790,741 A | * | 8/1998 | Vincent et al. | 385/135 |
| 6,226,434 B1 | * | 5/2001 | Koshiyama et al. | 385/134 |
| 6,466,725 B2 | * | 10/2002 | Battey et al. | 385/135 |
| 6,856,748 B1 | * | 2/2005 | Elkins et al. | 385/135 |
| 7,099,550 B1 | * | 8/2006 | Too | 385/134 |
| 2006/0093282 A1 | * | 5/2006 | Shepherd et al. | 385/90 |

* cited by examiner

*Primary Examiner*—Ellen Kim
(74) *Attorney, Agent, or Firm*—Harness, Dickey & Pierce, P.L.C.

(57) ABSTRACT

A fiber optic cable clamp module is disclosed. The clamp module includes a conductive contact for terminating a tracer wire. The clamp module retains the fiber optic cable and provides a weather tight seal around the cable. A carrier for a fiber optic cable clamp module is also disclosed. The carrier provides a connection to ground for a tracer wire when a clamp module containing the tracer wire is installed in the carrier. The carrier also has a switch for disconnecting the tracer wire from ground without physically removing the tracer wire. A method for installing fiber optic cable using a clamping module is also disclosed.

21 Claims, 8 Drawing Sheets

Fig. 8

CABLE CLAMP WITH INTEGRATED TRACE AND BOND CAPABILITY

FIELD

The present disclosure relates to cable clamps for fiber optic cable.

BACKGROUND

The statements in this section merely provide background information related to the present disclosure and may not constitute prior art.

Fiber optic cables are commonly used in the telecommunication industry. A fiber optic cable generally includes a protective outer jacket surrounding a buffer tube. The buffer tube contains a number of optical fibers. The cable often includes one or more flexible strength members that strengthen the cable while still allowing the cable to bend. A fiber optic cable can also include a tracer wire. The tracer wire is a conductive wire generally used for trouble shooting circuits and locating the cable.

When a technician is installing fiber cable drops, numerous devices and steps are commonly utilized to secure, protect and connect the cable and tracer wire as needed. The fiber optic cable is brought into the enclosure through a gasket. A portion of the fiber optic cable jacket is stripped and the strength members are attached to a point in the enclosure with various types of clamps, especially clamping washers, to provide strain relief for the cable. The tracer wire is separated from the fiber optic cable and routed to the ground bar of the enclosure. The tracer wire jacket is stripped and the tracer wire is bonded to a ground bar to ground the tracer wire. This is most frequently accomplished by wrapping the tracer wire around a threaded stud on the ground bar. The tracer wire is then held in place by screwing a nut onto the threaded stud.

When a technician needs to perform certain operations, such as toning a tracer wire to locate the cable with which it is associated, the technician must disconnect the tracer wire from the ground bar. The technician first needs to locate the correct tracer wire. Then the technician unscrews the nut holding the tracer wire on the threaded stud and removes the tracer wire. Finally, the technician can connect the test equipment to the tracer wire and perform the necessary tests. Once the tests are complete, the technician must reconnect the tracer wire to the threaded stud and screw the nut back onto the stud to hold the tracer wire in place.

SUMMARY

According to one aspect of the present disclosure, a fiber optic cable clamp module includes an enclosure having an opening and a cover for selectively covering the opening. The enclosure is configured to receive a jacketed portion of a fiber optic cable including a strength member into the enclosure and permit a buffer tube from the fiber optic cable to exit the enclosure when the fiber optic cable is present.

According to another aspect of the present disclosure, a fiber optic cable assembly includes a conductive contact for terminating a tracer wire to a grounding point. The assembly also includes a switch for disconnecting the tracer wire from the ground point when the tracer wire is so terminated.

According to yet another aspect of the present disclosure, a carrier for a fiber optic cable clamp assembly includes at least one bay with a first contact. The bay is configured to receive a fiber optic cable clamp module holding a fiber optic cable having a tracer wire terminated to a second contact. The first contact electrically connects the tracer wire, through the second contact, to a grounding point when the clamp module is received in the bay.

According to still another aspect of the present disclosure, a method of installing a fiber optic cable includes clamping a cable in a clamping module and inserting the clamping module into a carrier. The carrier is mounted in a telecommunications enclosure.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, its applications, or uses.

Figure 1:
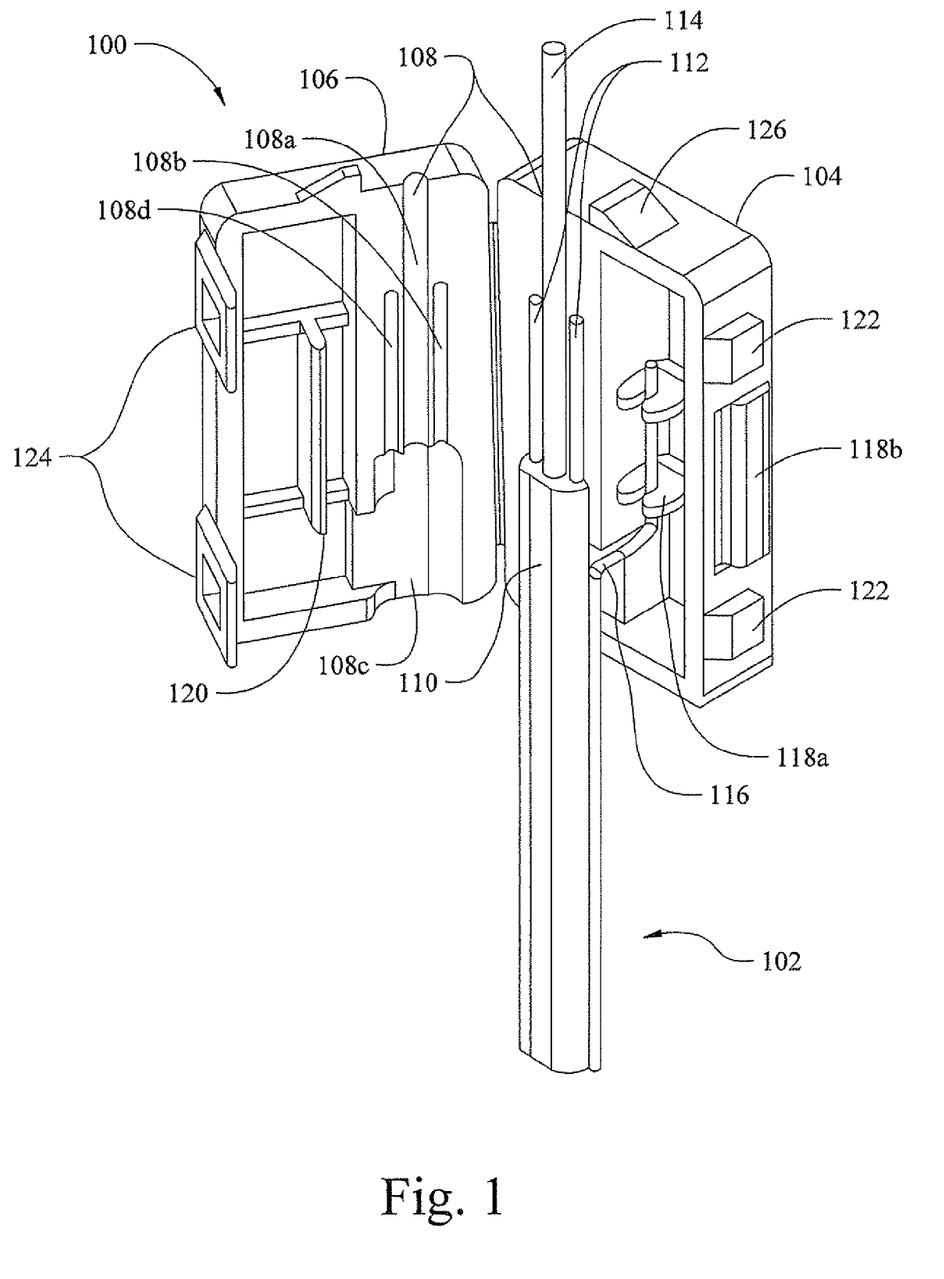
FIG. 1 is a front isometric view of a fiber optic cable clamp module with a fiber optic cable mounted therein.

FIG. 1 illustrates a fiber optic cable clamp module, generally indicated by reference numeral 100, according to one embodiment of the present disclosure. For illustrative purposes, a fiber optic cable 102 is also illustrated in FIG. 1. The clamp module 100 includes an enclosure 104 having a cover 106. A channel 108 in the enclosure 104 and the cover 102 is designed to receive the fiber optic cable 102. The channel 108 traverses from one end of the enclosure 104 and cover 106 to an opposite end (e.g., from top to bottom in FIG. 1).

As can be seen in FIG. 1, the channel 108 is not a uniform channel, but includes differently shaped portions 108a-d (in the enclosure 104 and the cover 106) for receiving different portions of the fiber optic cable 102. A jacketed portion 110 of the fiber optic cable 102 is received within portion 108c of the channel 108. A portion of the jacket of the fiber optic cable 102 is removed and strength members 112 and a buffer tube 114 are exposed and received within portions 108a-c of the channel 108. Neither the strength members 112 nor the jacketed portion 110 of the fiber optic cable exit the top portion of the enclosure 104. Instead, these portions enter the channel 108 at one end of the enclosure 104 and terminate before exiting the channel 108 at the other end. The buffer tube 114, however, does exit the top end of the enclosure 104.

A tracer wire 116 is illustrated attached to the fiber optic cable 102. One end of the tracer wire 116 is separated from the cable 102 and a portion of the insulation covering the tracer wire 116 is removed. The tracer wire 116 is connected to a conductive contact 118 of the enclosure 104. The conductive contact 118 includes a portion 118a inside the enclosure 104 and a portion 118b outside the enclosure 104. The tracer wire 116 is connected to the inside portion 118a of the conductive contact 118 inside the enclosure 104. The internal portion is illustrated as two v-shaped terminals in FIG. 1, however numerous other configurations are possible.

The conductive contact 118 may include an insulation displacement connector (IDC), that pierces the insulation of the tracer wire 116. In such an embodiment, the covering insulation of the tracer wire 116 need not be removed. The external portion 118b of the conductive contact is electrically connected to the internal portion 118a of the conductive contact 118 and, in the embodiment of FIG. 1, are formed from a unitary piece of conductive material. The conductive contact 118 allows an electrical connection to the tracer wire 116 to be made, through the external portion 118b of the conductive contact, while the cover 106 is closed and the tracer wire 116 is terminated to the inside portion 118a within the enclosure 104.

When the cover 106 is in a closed position, the two halves of the channel 108 (one on the enclosure 104 and one on the cover 106) enclose the jacketed portion 110, the strength members 112 and a portion of the buffer tube 114. In this closed position, the enclosure 104 clamps the fiber optic cable 102 and holds it securely in place. In particular, it holds the strength members 112 tightly to provide strain relief for the fiber optic cable 102. The closed position also provides a weather-tight seal around the cable 102 due to the channel 108 being sized to fit the cable closely.

The clamp module 100 also includes a retaining rib 120. The retaining rib 120 is positioned on the cover 106 and aids in retaining the tracer wire 116 in contact with the inside portion 118a of the conductive contact. When the cover 106 closes, the retaining rib 120 applies a biasing force against the tracer wire to hold the tracer wire 116 in contact with the inside portion 118a of the conductive contact 118.

The clamp module 100 also includes a snap-fit closure. The closure has two components, a male member 122 and a mating female member 124. Two such closures are illustrated in FIG. 1, but more or fewer may be used. When the cover 106 is closing, the resilient female member 124 is forced to bend and travel over the male member. The female member 124 then returns approximately to its original unbent position with the male member 122 retained within the opening of the female member 124. To open the cover 106, the female member 124 can be bent upwards over the edge of the male member. Additionally, or alternatively, the clamp module 100 may include a connector (not shown), such as a screw, bolt, etc., for holding the closure in a closed position. If used together with a snap-fit closure, the connector may be engaged after the male member 122 and female member 124 are snapped together.

After a fiber optic cable 102 is mounted in the clamp module 100, the clamp module 100 can be installed in a carrier. One example of a suitable carrier will be discussed in detail below. The clamp module 100 includes a mounting male member 126 on the top of the enclosure 104 for providing a snap-fit installation into the carrier.

Figure 2:
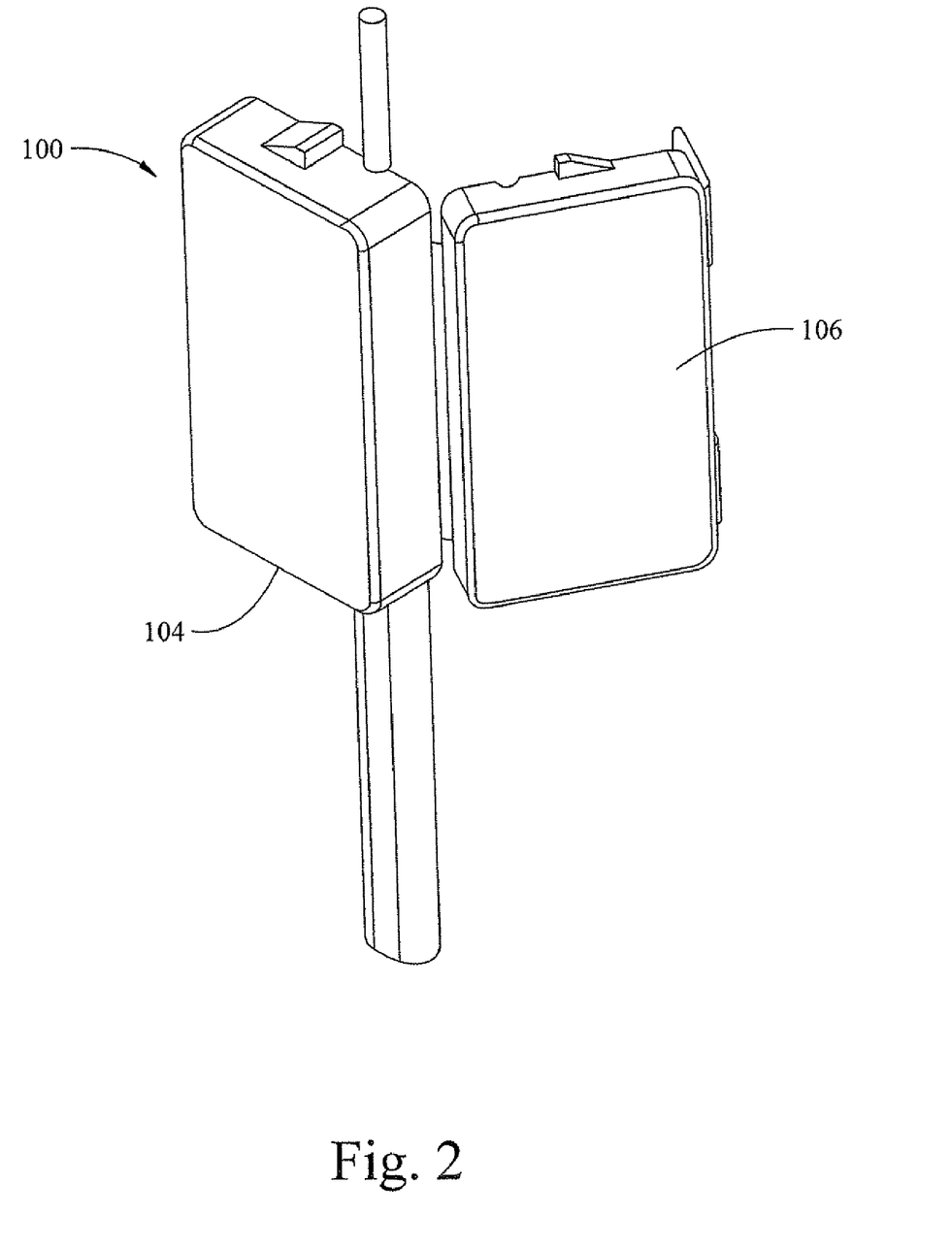
FIG. 2 is a rear isometric view of the fiber optic cable clamp module shown in FIG. 1.

As shown in FIG. 2, the enclosure 104 and the cover 106 are not symmetrical. The cover portion 106 is smaller in depth than the enclosure 104. The extra depth of the enclosure 104 allows room for the conductive contact 118.

Figure 3:
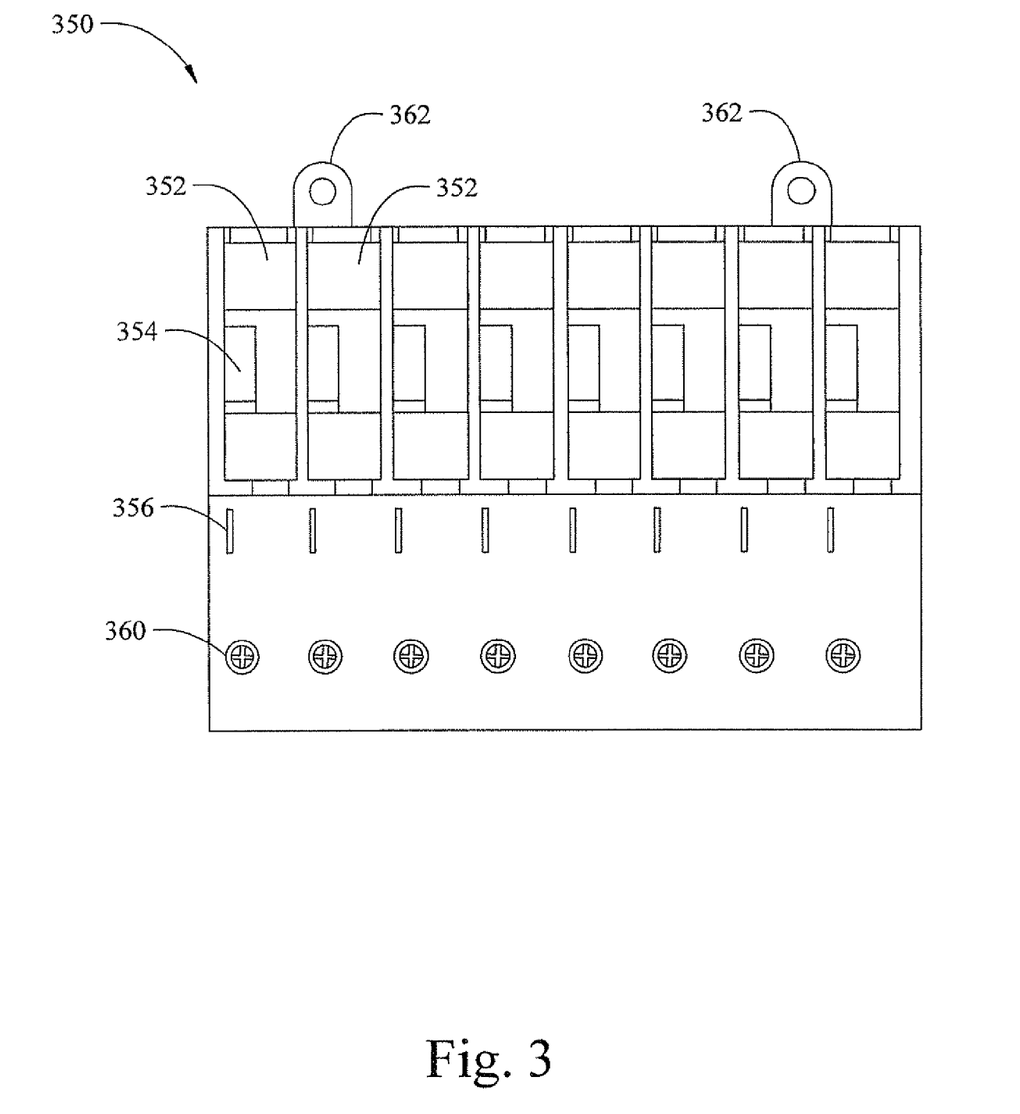
FIG. 3 is a front view of a carrier for the fiber optic cable clamp module of FIG. 1.
Figure 4:
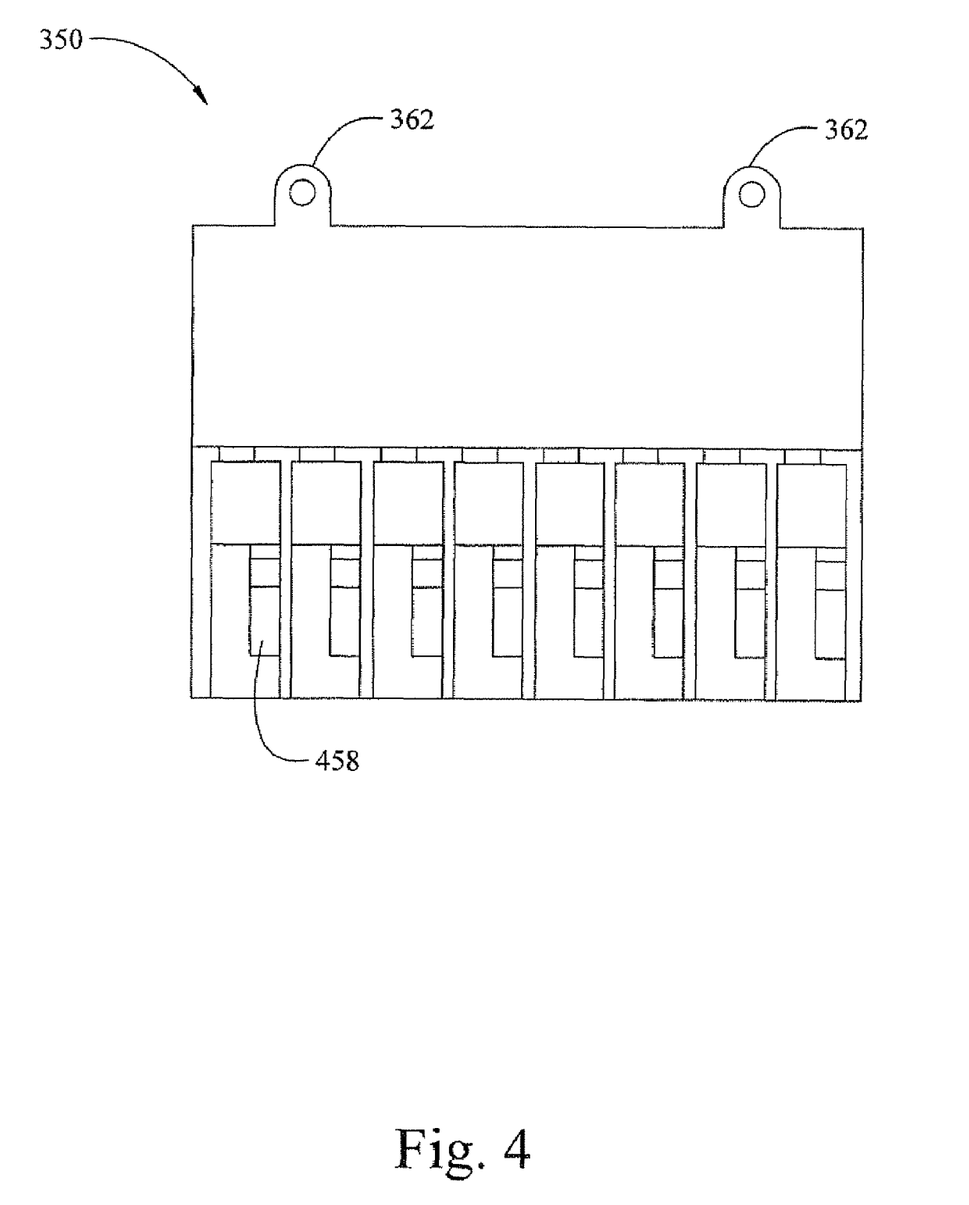
FIG. 4 is a rear view of the carrier of FIG. 3.
Figure 5:
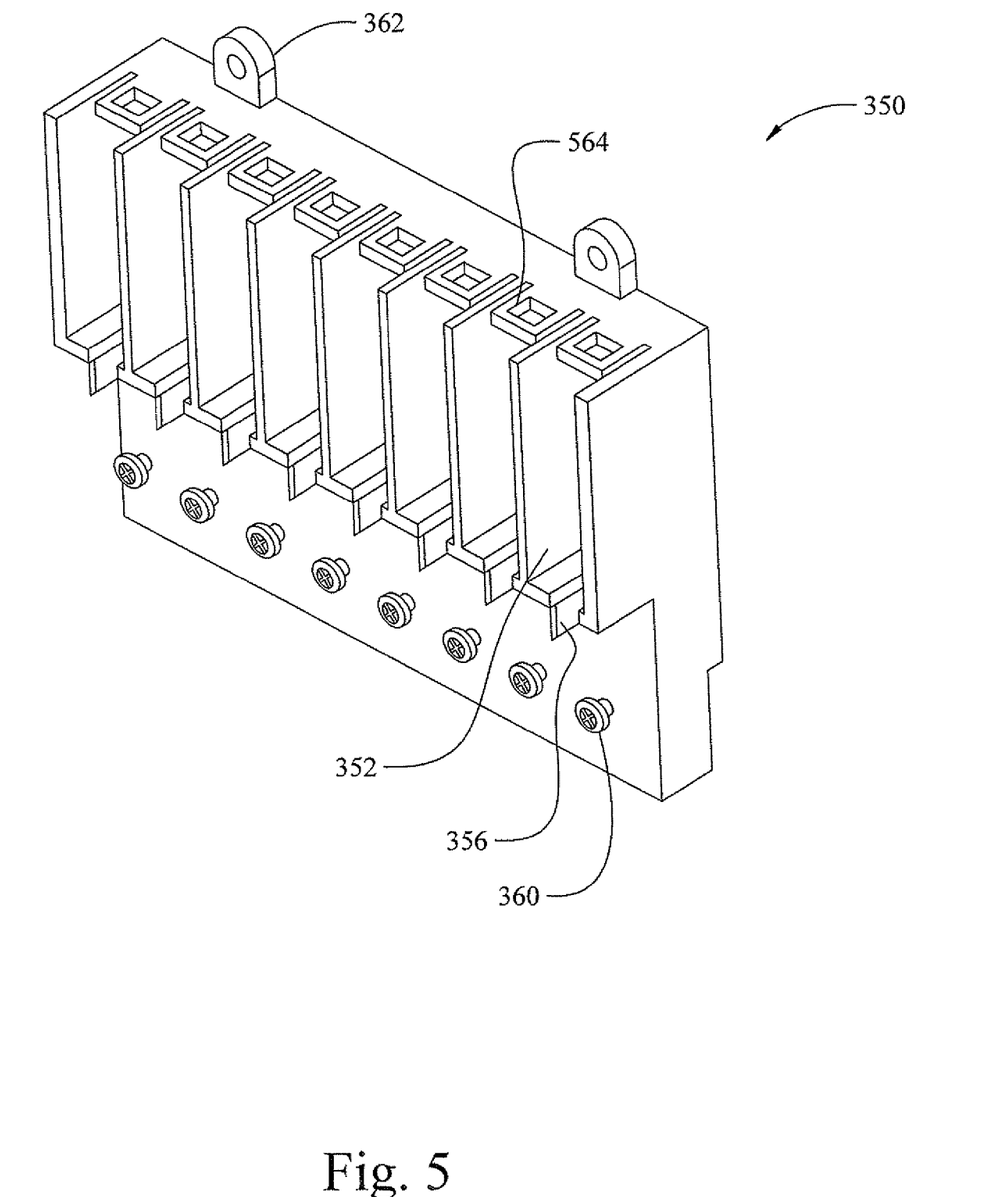
FIG. 5 is a front isometric view of the carrier of FIG. 3.

FIGS. 3-5 illustrate one embodiment of a carrier 350 for a fiber optic cable clamp assembly. The carrier 350 has several bays 352 for receiving cable clamp modules 100. Eight such bays are illustrated, but more or less bays may be included as desired. Each bay 352 in the carrier 350 includes a carrier contact 354. The carrier contact 354 touches the external portion 118b of a clamp module's conductive contact 118 when the clamp module 100 is mounted in the carrier. The carrier contact 354 is electrically connected to a an associated testing terminal 356 and an associated grounding point 458 (shown in FIG. 4) on the backside of the carrier. The carrier contact 354, testing terminal 356 and grounding point 458 can be made of a single unitary piece of conductive material or separate, but electrically connected, pieces of conductive material. The conductive material can be any conductive material suitable for such purpose including alloys such as beryllium copper and phosphor bronze. A switch 360 (e.g., a screw in the illustrated embodiment) connects and disconnects an associated grounding point 458 to and from a ground bar 668 (shown in FIG. 6). Mounting tabs 362 are included for mounting the carrier 350 to a suitable support structure (e.g., within an outdoor telecommunications equipment enclosure). Numerous other methods of mounting the carrier are, however, also possible.

Figure 6:
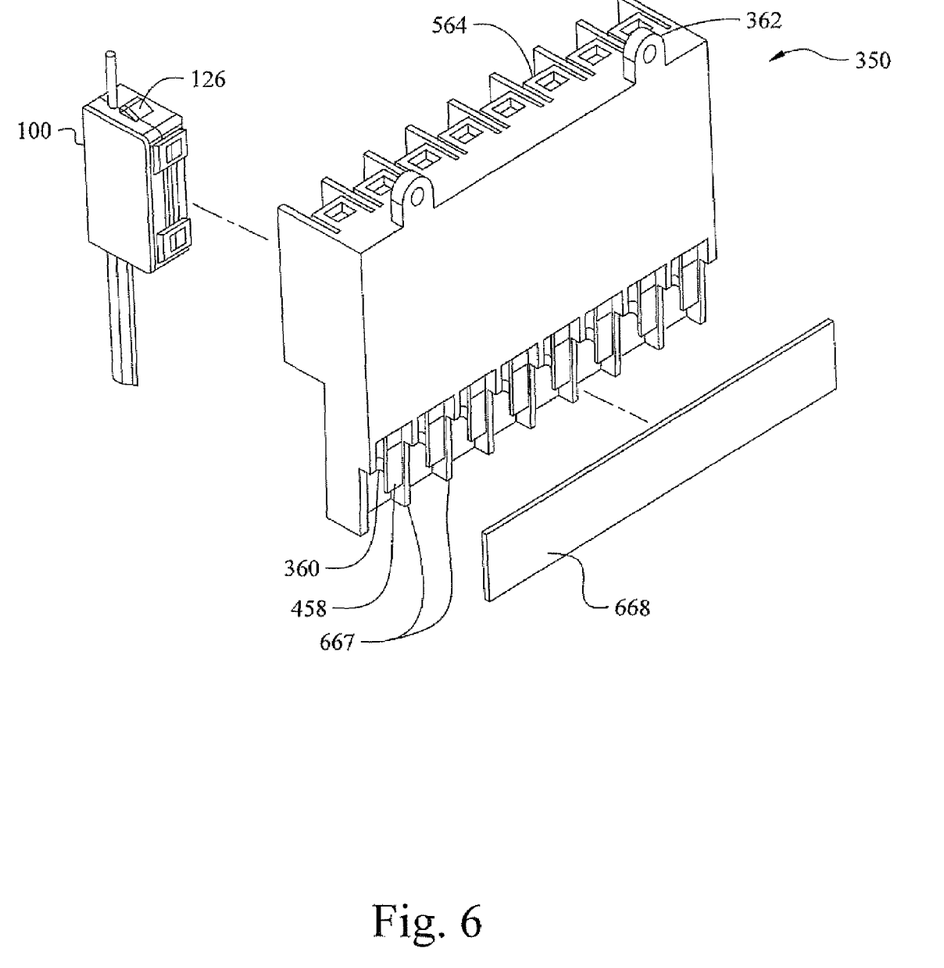
FIG. 6 is a rear isometric exploded view of the cable clamp assembly including a carrier and a clamp module with a fiber optic cable mounted therein.

When the carrier 350 is installed in an enclosure, such as a telecommunications equipment enclosure, it is installed such that each grounding point 458 is adjacent to a ground bar 668, illustrated in FIG. 6. The ground bar 668 rests against insulative dividers 667 positioned between the grounding points 458. The grounding points 458 are initially spaced from and not in contact with the ground bar 668. Each switch 360 allows its associated grounding point 458 to be connected to and disconnected from the ground bar 668. Movement of the switch 360 pushes the grounding point 458 toward the ground bar 668 to connect the grounding point 458 to ground. When the switch 360 connects the grounding point 458 to the ground bar 668, the testing terminal 356 and the carrier contact 354 are grounded. When a clamp module 100 having a fiber optic cable mounted therein is installed in the carrier 350, the tracer wire 116 is grounded through the conductive contact 118, which is electrically connected to the carrier contact 354 via the outside portion 118b. An installer or technician can then disconnect the tracer wire 116 from ground in order to perform tests using the tracer wire 116, such as toning the tracer wire 116, by simply actuating the switch 360 to disconnect the associated grounding point 458 from the ground bar 668. Doing so leaves the tracer wires 116 of other cables in other bays 352 of the carrier 350 connected to ground and only disconnects the desired tracer wire 116 from the ground bar 668. Further, the technician can make a connection to the tracer wire 116 through the test terminal 356. The technician is, therefore, able to disconnect the tracer wire 116 from ground and test the tracer wire 116 without removing the tracer wire 116 from the clamp module 100, without removing the clamp module 100 from the carrier, and without even opening the clamp module 100.

The carrier includes mounting female members 564 in each bay 352 as illustrated in FIGS. 5 and 6. These mounting female members 564 mate with the mounting male members 126 on the cable modules 100. The male and female members 126, 564 form a snap-fit connection between each module 100 and the carrier 350. The snap-fit connection is formed by sliding the module 100 into a bay until the female member 564 snaps down over the male member 126. This provides a solid, but removable, connection between each module 100 and the carrier 350.

Figure 7:
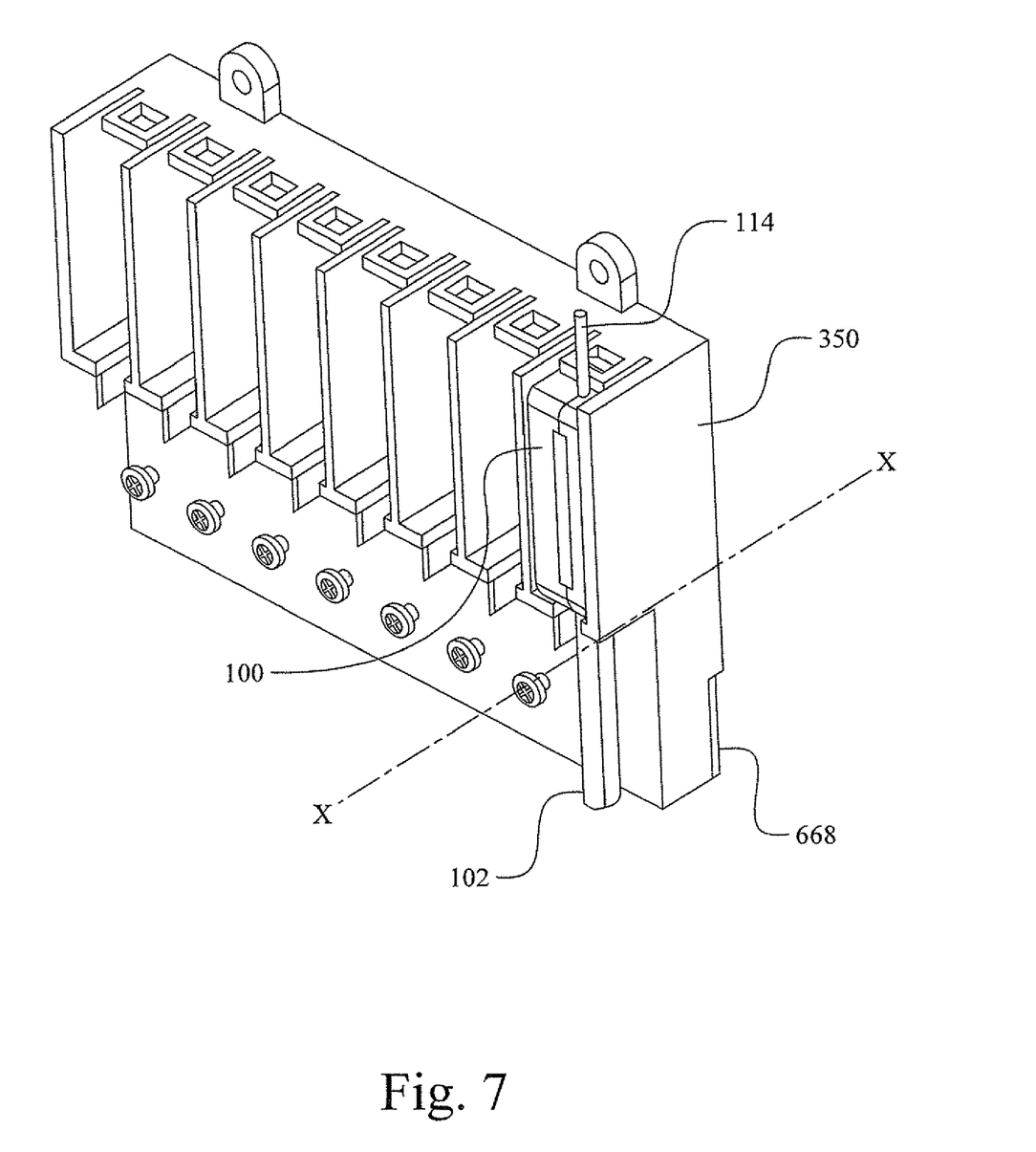
FIG. 7 is a front isometric view of a cable clamp assembly including a carrier with an installed clamp module with a fiber optic cable mounted therein.
Figure 8:
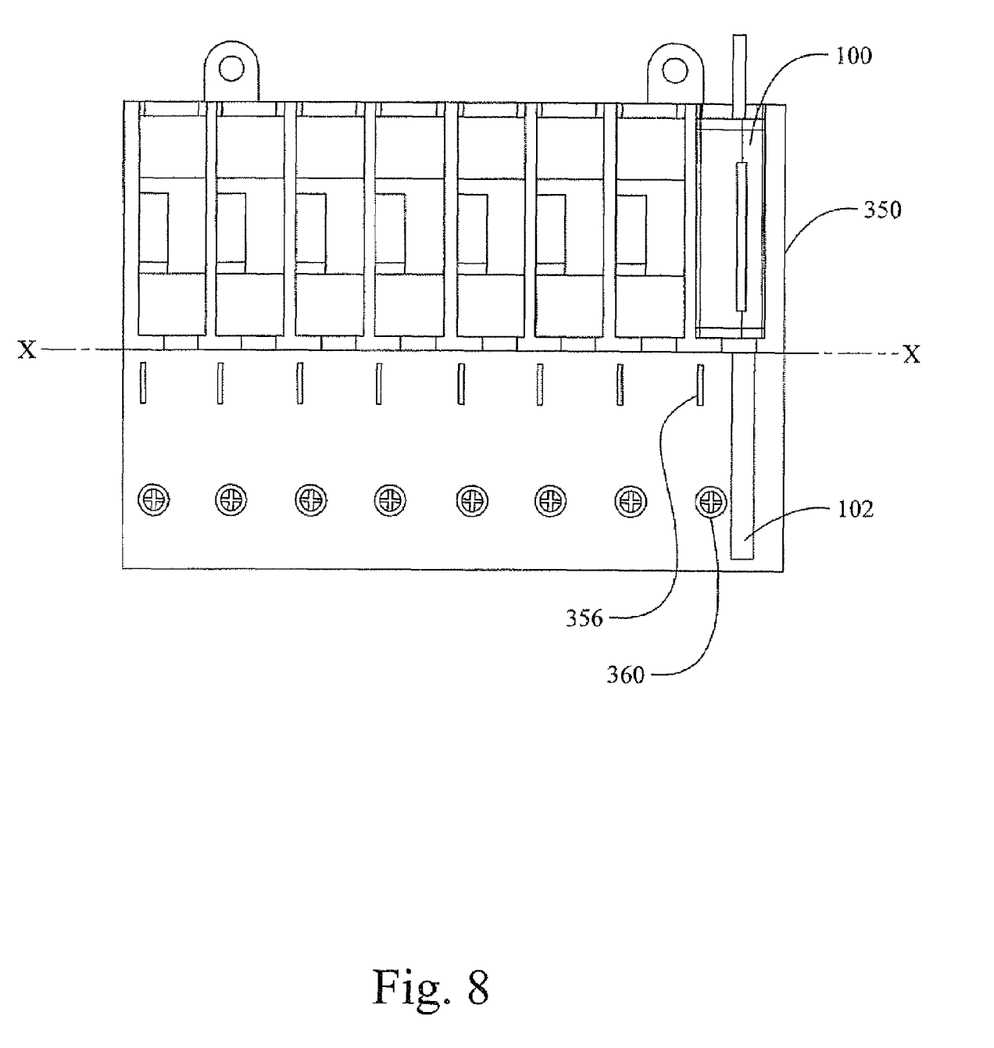
FIG. 8 is a front view of a cable clamp assembly including a carrier with an installed clamp module with a fiber optic cable mounted therein.

FIGS. 7 and 8 illustrate the carrier 350 with a clamp module 100 installed in one of the bays 352. The clamp module 100 has a fiber optic cable 102 mounted in the clamp module 100. The jacketed fiber optic cable 102 and tracer wire 116 enter the clamp module 100 and only the buffer tube 114 exits on opposite end of the module 100. The fiber optic cable 102 is held firmly by the module 100, which is held by the carrier 350. The buffer tube 114 exits the module 100 to be routed to various locations as needed.

When mounted in an enclosure, such as a telecommunications equipment enclosure, the carrier 350 can form a weather tight entrance to the equipment enclosure. The carrier is mounted in an opening of the equipment enclosure such that the portion of the carrier 350 above the line X-X in FIG. 8 is within internal position the equipment enclosure and the portion of the carrier 350 below the line X-X is positioned on an external surface of the equipment enclosure. Thus, the portion of the cable 102 outside of the equipment enclosure includes the jacket. The cable module 100 creates a weather tight seal around the cable 102, as discussed above, and the unprotected buffer tube 114 exits the module 100 inside the equipment enclosure. Additionally, this mounting configuration allows a technician to access the testing terminals 356 and the switches 360 from outside the equipment enclosure. Therefore, the technician can disconnect a single tracer wire 116 from ground, perform the needed tests, and reconnect the tracer wire 116 to ground, all from outside the equipment enclosure and without removing the cable 102, the strength members 112 or the tracer wire 116 from the module 100, without removing the module 100 from the carrier 350 and without removing the carrier 350 from the equipment enclosure.

As best shown in FIG. 8, the cable 102 enters the clamp module 100 off center. In addition to providing room for the conductive contact 118 within the clamp module 100, the offset allows the cable 102 to pass up the carrier 350 and enter the module 100 without interfering with access to the testing terminal 356 or the switch 360.

While the present disclosure has been described with reference to certain preferred embodiments, it is to be understood that the present disclosure is not limited to such specific embodiments. Specifically, the various elements described in this disclosure may be combined, removed, or included in different combinations without departing from the scope of this disclosure. Other modifications and additions may be made without departing from the spirit and scope of this disclosure.

What is claimed:

1. A fiber optic cable clamp module comprising an enclosure having an opening, the enclosure including a cover coupled to the enclosure for selectively covering the opening and a conductive contact including an interior portion inside the enclosure for connection to a tracer wire attached to a fiber optic cable and an external portion at least partially outside the enclosure electrically connected to the interior portion, the conductive contact allowing an electrical connection to the tracer wire to be made through the external portion while the cover is closed and the tracer wire is connected to the interior portion, the enclosure configured to receive a jacketed portion of a fiber optic cable including a strength member into the enclosure and permit a buffer tube from the fiber optic cable to exit the enclosure when the fiber optic cable is present, the enclosure and the cover configured to cooperatively clamp the strength member within the housing when the fiber optic cable is received within the housing and the cover is covering the opening.

2. The clamp module of claim 1 wherein the conductive contact includes an insulation displacement contact.

3. The clamp module of claim 1 wherein the conductive contact includes at least one v-shaped terminal, the v-shaped terminal configured to receive and retain the tracer wire.

4. The clamp module of claim 1 further comprising a retaining rib positioned on the cover to prevent separation of the tracer wire from the conductive contact when the cover is in a closed position.

5. The clamp module of claim 1 wherein the enclosure includes a snap lock closure for holding the cover in a closed position.

6. The clamp module of claim 1 further comprising at least one snap catch for securing the clamp module in a carrier for a fiber optic clamp assembly.

7. The clamp module of claim 1 wherein the conductive contact is configured to connect the tracer wire to ground when the clamp module is mounted in a carrier for a fiber optic clamp assembly.

8. The clamp module of claim 1 further including a fiber optic cable having an outer jacket, a buffer tube, at least one strength member, the fiber optic cable mounted in the clamp module, a jacketed portion of the fiber optic cable including the strength member clamped in the enclosure, the buffer tube passing out of the clamp, and the tracer wire connected to the conductive contact.

9. The clamp module of claim 1 wherein the enclosure is configured to bias a fiber optic cable tracer wire to a ground terminal when a fiber optic cable is mounted in the clamp module and the cover is in a closed position.

10. A fiber optic cable assembly, the assembly comprising at least one fiber optic cable module for holding a fiber optic cable having a tracer wire, the cable module including a conductive contact having an interior portion within the cable module for electrical connection to the tracer wire and an exterior portion at least partially outside the cable module electrically connected to the interior portion, and a carrier for receiving the cable module, the carrier including a switch for selectively electrically connecting the tracer wire through the conductive contact to a ground when the cable module is received in the carrier and a tracer wire is so connected.

11. The assembly of claim 10 wherein the carrier further comprises a test terminal, the test terminal for connecting to the tracer wire through the conductive contact when a tracer wire is so connected.

12. The assembly of claim 10 wherein the assembly provides a seal around a fiber optic cable when a fiber optic cable is connected to the assembly.

13. The assembly of claim 10 further comprising a clamp for holding a fiber optic cable when a fiber optic cable is connected to the assembly.

14. A carrier for a fiber optic cable clamp assembly, the carrier comprising a plurality of bays, each bay including a first contact, each bay configured to receive a fiber optic cable clamp module holding a fiber optic cable having a tracer wire connected to a second contact, the second contact including an interior portion to which the tracer wire is connected inside the clamp module and an exterior portion at least partially outside the clamp module electrically connected to the interior portion, and the first contact for electrically connecting the tracer wire through the second contact to a grounding point when the clamp module is received in the bay.

15. The carrier of claim 14 further comprising a switch for selectively connecting the grounding point to a ground when the carrier is positioned in proximity to the ground.

16. The carrier of claim 14 further comprising a test terminal connected to the first contact.

17. A method of installing a fiber optic cable, the method comprising clamping a fiber optic cable in a clamping module and inserting the clamping module into a carrier, the carrier mounted in a telecommunications enclosure, the clamping module including an enclosure having an opening, a cover coupled to the enclosure for selectively covering the opening and a conductive contact for connection to a tracer wire of a fiber optic cable, the opening and the cover configured to cooperatively clamp a strength member of the fiber optic cable when the cover is covering the opening, the conductive contact including an interior portion inside the enclosure for connection to the tracer wire and an external portion at least partially outside the enclosure electrically connected to the interior portion.

18. The method of claim 17 wherein clamping the cable includes connecting a tracer wire of the fiber optic cable to the conductive contact.

19. The method of claim 18 wherein inserting the clamping module connects the tracer wire to a ground through the conductive contact.

20. The method of claim 19 wherein the carrier includes a switch for disconnecting the tracer wire from the ground.

21. The method of claim 18 wherein inserting the clamping module electrically connects the tracer wire to a test terminal on the carrier.

\* \* \* \* \*